UNITED STATES PATENT OFFICE.

JOHN B. WOOD, OF BROOKLYN, NEW YORK, ASSIGNOR TO MARY MANROSS WOOD AND WILLIAM LAWRENCE QUINN, BOTH OF SAME PLACE.

MIXED PAINT.

SPECIFICATION forming part of Letters Patent No. 312,784, dated February 24, 1885.

Application filed August 25, 1884. (No specimens.)

*To all whom it may concern:*

Be it known that I, JOHN B. WOOD, a citizen of the United States, residing at Brooklyn, in the county of Kings and State of New York, have invented a new and useful Composition of Matter to be used for Paint, of which the following is a full, clear, and exact specification.

My composition consists of the following ingredients, combined in the proportions stated, viz: creosote or dead-oil, eight gallons; coal-tar, six gallons; spirits of turpentine, one gallon; plumbago, eight ounces, by weight. These ingredients are to be thoroughly mingled by stirring or otherwise.

In the above-named composition is produced a paint useful for application to the bottoms of marine and other vessels, whether made of wood or iron, to smoke-stacks, and iron-work exposed to air and water and liable to rust, and to outside brick, gables, and the rear of houses, possessing numerous advantages over the common kinds of paint now employed for such purposes. It is a black liquid composition, which is always ready for use, and is applied by a brush, under which it flows freely.

For protecting the bottoms of wooden vessels it is found to be much superior to the ordinary copper paint which is now extensively applied to them, for, instead of covering the outside of the wood like a plaster, as copper and many other paints do, it penetrates and fills its pores, and, being itself absolutely water-proof, thereby renders the wood better adapted than such other paints can to withstand the action of the water. When this composition is applied to the bare wood, sea-worms will not enter the wood and barnacles will not grow upon it. When used upon iron vessels (and it makes a good covering for the inside as well as for the outside) or smoke-stacks, or iron-work of any description which it is desired to protect from exposure to the air or water, it excels all other of the common compounds or paints adapted to such uses. It will not flake or scale off, and the iron will not rust under it. It is anti-fouling on the bottoms of iron as well as of wood vessels, and prevents barnacles or grass from growing thereon. Whether it be applied to wood or iron vessels, two or three coats is the proper quantity to use. For outside brick, gables, and the rear of houses it is useful to prevent rain from entering the bricks, and it keeps the walls entirely free from dampness. It is much cheaper than other compositions of its class, which is due to two causes—the quantity in each case being the same: first, it costs less to make it than to make any of the other kinds, and, secondly, it covers a greater surface than any of them cover.

While the proportions above given are such as in my experiments have been found to produce the best results, still these proportions may be somewhat varied without materially altering the character of the compound.

I am aware that a composition consisting of tar, asphaltum, silicate of soda, dead-oil, ground slate, plumbago, gum-dammar, lime, coal-ashes, and rosin-oil has been used for the same purpose, and that a patent therefor was granted to Frederick A. Stall, August 19, 1873, No. 141,897; but I am not aware that all the ingredients of my composition in the proportions stated have been used together.

Having now described my invention, what I claim as new, and desire to secure by Letters Patent of the United States, is—

The above-described composition for paint, consisting of creosote or dead-oil, coal-tar, spirits of turpentine, and plumbago, in the proportions substantially as set forth.

JOHN B. WOOD.

In presence of—
G. M. PLYMPTON,
D. A. CARPENTER.